(12) United States Patent
Donaldson

(10) Patent No.: US 8,616,813 B2
(45) Date of Patent: Dec. 31, 2013

(54) STRAP FOR A VEHICLE SIDE CURTAIN OR LOAD RESTRAINT

(75) Inventor: Stuart Donaldson, Victoria (AU)

(73) Assignee: Polyweld Pty. Ltd., Campbellfield (AT)

( * ) Notice: Subject to any disclaimer, the term of this patent is extended or adjusted under 35 U.S.C. 154(b) by 32 days.

(21) Appl. No.: 13/320,366

(22) PCT Filed: May 13, 2010

(86) PCT No.: PCT/AU2010/000557
§ 371 (c)(1),
(2), (4) Date: Feb. 6, 2012

(87) PCT Pub. No.: WO2010/130001
PCT Pub. Date: Nov. 18, 2010

(65) Prior Publication Data
US 2012/0132377 A1    May 31, 2012

(30) Foreign Application Priority Data
May 13, 2009    (AU) .............................. 2009902145

(51) Int. Cl.
*B32B 5/12*    (2006.01)
(52) U.S. Cl.
USPC .......................................... 410/118; 428/114

(58) Field of Classification Search
USPC .......................................................... 410/118
See application file for complete search history.

(56) References Cited

U.S. PATENT DOCUMENTS 5,436,044 A * 7/1995 Pinkos .......................... 428/36.1

FOREIGN PATENT DOCUMENTS

GB    2049564 A * 12/1980

OTHER PUBLICATIONS http://www.teijinaramid.com/aramids/technora/ Teijin Human Chemistry, Human Solutions—Technora Jun. 9, 2010.*

* cited by examiner

*Primary Examiner* — H Gutman
(74) *Attorney, Agent, or Firm* — Ryan Kromholz & Manion, S.C.

(57) ABSTRACT

A strap that includes a casing, and a plurality of stuffer strands that extend lengthwise through the casing. The stuffer strands are located between two layers of the casing and are arranged in at least two sets. The stuffer strands resist elongation of the strap in response to tensile forces applied in the elongate direction of the strap, and have a maximum elongation at break of less than 7.5%.

20 Claims, 5 Drawing Sheets

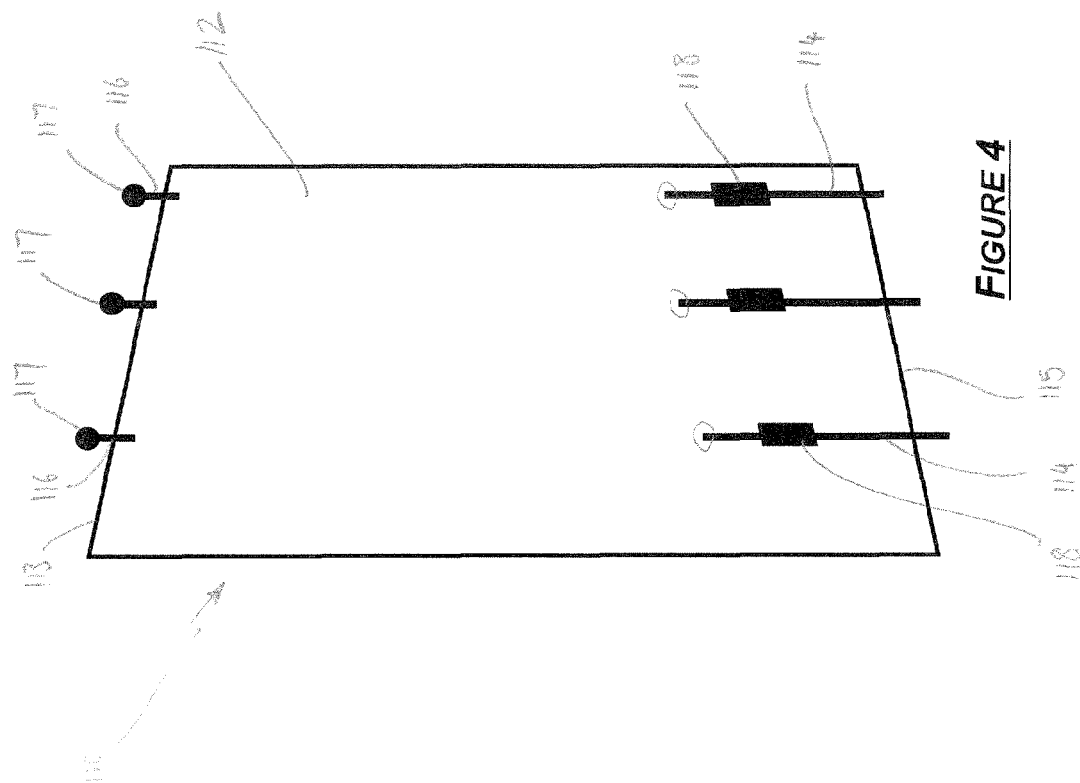
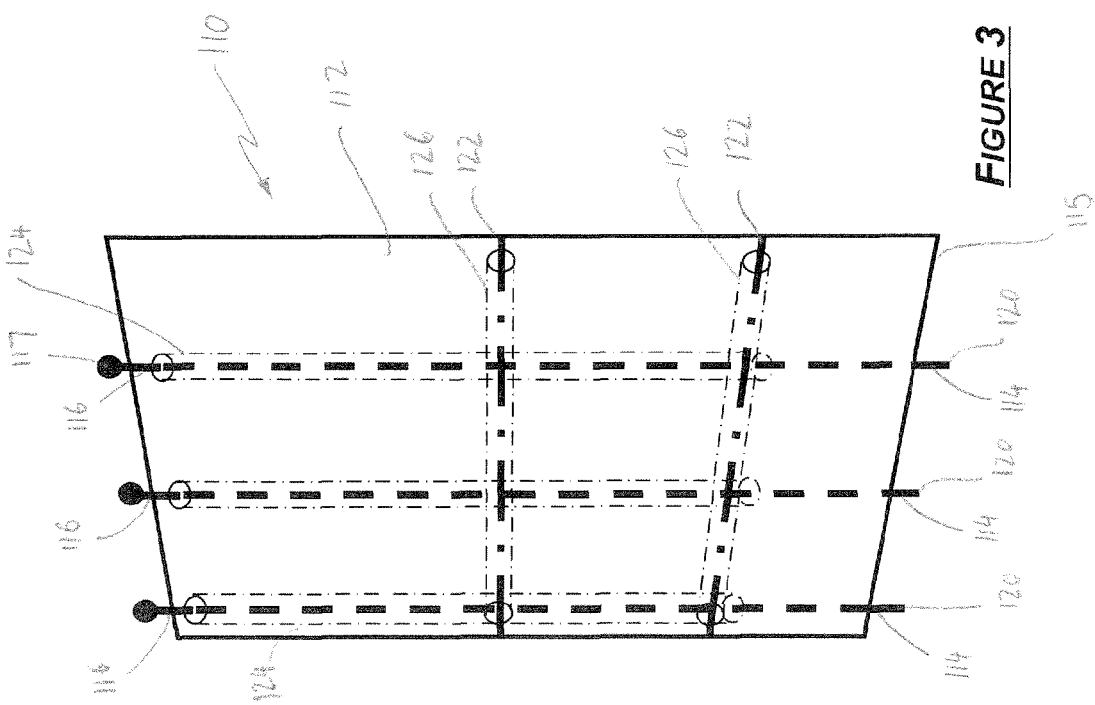

| | | | | | | | | | |
|---|---|---|---|---|---|---|---|---|---|
| 10 | | X | | | X | | | | |
| 9 | | X | | X | X | X | | X | X | X |
| 8 | | | | X | | | | X | | |
| 7 | | X | X | X | | X | X | X | | |
| 6 | | X | | | X | | | | | |
| 5 | | X | | X | X | X | | X | X | |
| 4 | | | | X | | | | X | | |
| 3 | | X | X | X | | X | X | X | | |
| 2 | | X | | X | | X | | X | | |
| 1 | | | X | | X | | X | | | |

STRAP FOR A VEHICLE SIDE CURTAIN OR LOAD RESTRAINT

FIELD OF THE INVENTION

The present invention relates to a vehicle side curtain. The present invention also relates to a strap that is suitable for use in a vehicle side curtain.

BACKGROUND

It is known to use curtains on the sides of vehicles, such as trucks and truck trailers, to assist in enclosing a load within the load bay of the vehicle to protect the load from damage and the elements. For simplicity in this specification, the word "truck" is used to refer to vehicles, including both trucks and a truck trailers. The curtain is hung from a track in the roof of the load bay of the truck, such that the curtain can be drawn horizontally to access or cover the load bay area. This type of truck is often known as a "curtain-sider".

A load within the truck must be restrained to minimize the possibility of the load moving. However, as the truck is in motion, the load can become loose and move. Alternatively, lateral forces on the load, which can occur when the truck is on a slope or where the truck is turning, can also cause the load to move. This is known as "load shift", which can result in the vehicle becoming unstable due to the change in the vehicle's centre of gravity. A load shift is dangerous because it changes the handling of the truck. The shifting of the load can alter the stability of the truck and, depending on the severity of the load shift, can cause the vehicle to topple and pose a risk to property and can cause serious injury or death.

A variety of restraints and load restraint mechanisms are used to minimize load shifts. However, there still remains a need for a simple and effective means for restraining loads.

SUMMARY OF THE INVENTION

The present invention provides a vehicle side curtain comprising:
a sheet with an upper edge for location adjacent the roof of the vehicle;
a first set of straps that extend between two opposing edges of the sheet and are at least partially restrained to the sheet, each of the straps includes one or more stuffer strands that resist elongation of the respective strap in response to tensile forces applied in the elongate direction of the strap, and the stuffer strands have a maximum elongation at break of less than 7.5%.

In certain embodiments, the first set of straps extend between the upper edge and the opposing lower edge of the sheet.

In certain embodiments, the vehicle curtain may further comprise a second set of like straps that extend transversely to the first set of straps and are at least partially restrained to the sheet.

In certain embodiments, the stuffer strands have a maximum elongation at break of less than 5%. In particular embodiments, the stuffer strands have a maximum elongation at break of approximately 4.6%.

The stuffer strands are preferably made of a material having a tensile strength at 250° C. that is greater than at least half the tensile strength at room temperature.

In certain embodiments, the stuffer strands are made of aramid fibres. In further particular embodiments, the stuffer strands are made of para-linked aramid fibre. In certain particular embodiments, the stuffer strands are made of TECHNORA® aramid fibre.

Preferably, the stuffer strands are parallel with the elongate direction of the respective strap throughout the length of the strap.

In certain embodiments, each strap further comprises:
a casing; and
the stuffer strands extend lengthwise through the casing and are located between two layers of the casing, with the stuffer strands being arranged in at least two sets.

The casing can be formed of an intermeshing assembly of strands. In some embodiments, the casing may be of woven construction. In some alternative embodiments, the casing may be of knitted construction. In some further alternative embodiments, the casing may be in the form of a non-fibrous sheath.

In some embodiments, each strap may be restrained to the sheet by welding. In such embodiments, the strap may be coated with PVC and the sheet made of PVC.

In some alternative embodiments, the sheet is formed with a plurality of sleeves, and each strap passes through one of the sleeves to restrain the respective strap to the sheet.

The present invention also provides a strap comprising:
a casing, and
a plurality of stuffer strands extending lengthwise through the casing and being located between two layers of the casing, the stuffer strands being arranged in at least two sets,
wherein the stuffer strands resist elongation of the strap in response to tensile forces applied in the elongate direction of the strap, and the stuffer strands have a maximum elongation at break of less than 7.5%.

In some embodiments, the casing is formed of an intermeshing assembly of strands.

In one embodiment, the casing has a woven construction that includes warp strands extending in the elongate direction of the strap, and at least one weft strand that is interwoven transversely with the warp strands; the strap further comprises at least one binder strand that extends in the warp direction of the strap, that is interwoven with the at least one weft strand, and that spaces adjacent sets of stuffer strands; and wherein the plurality of stuffer strands are located between two layers of warp strands.

In certain embodiments, the stuffer strands have a maximum elongation at break of less than 5%. In particular embodiments, the stuffer strands have a maximum elongation at break of approximately 4.6%.

The stuffer strands are preferably made of a material having a tensile strength at 250° C. that is greater than at least half the tensile strength at room temperature.

In certain embodiments, the stuffer strands are made of aramid fibres. In further particular embodiments, the stuffer strands are made of para-linked aramid fibre. In certain particular embodiments, the stuffer strands are made of TECHNORA® aramid fibre.

The strap may comprise a locking strand for forming locking stitches with the weft strand at an edge.

In some alternative embodiments, the casing has a knitted construction with chains extending in the elongate direction of the strap, and one or more weft strands that intermesh with the chains to form the casing with the plurality of stuffer strands therebetween.

In certain embodiments, the stuffer strands support substantially all the tensile force applied in the elongate direction of the strap.

The strap may be coated with polyvinyl chloride.

In some alternative embodiments, the casing is in the form of a non-fibrous sheath.

The non-fibrous sheath may be made of plastics material that is extruded with the stuffer strands disposed within the sheath.

Alternatively, the non-fibrous sheath may be two layers that are joined at their peripheral edges.

The present invention also provides a load restraining system that comprises the strap described above.

The load restraining system may further comprise tensioners. The tensioners may be in the form of: ratchets, buckles and/or winches.

BRIEF DESCRIPTION OF THE DRAWINGS

In order that the invention may be more easily understood, an embodiment will now be described, by way of example only, with reference to the accompanying drawings, in which:

FIG. 3: is perspective view of an internal side of a curtain according to a second embodiment of the present invention;

FIG. 4: is a perspective view of an external side of the curtain of FIG. 3;

DETAILED DESCRIPTION

Figure 2:
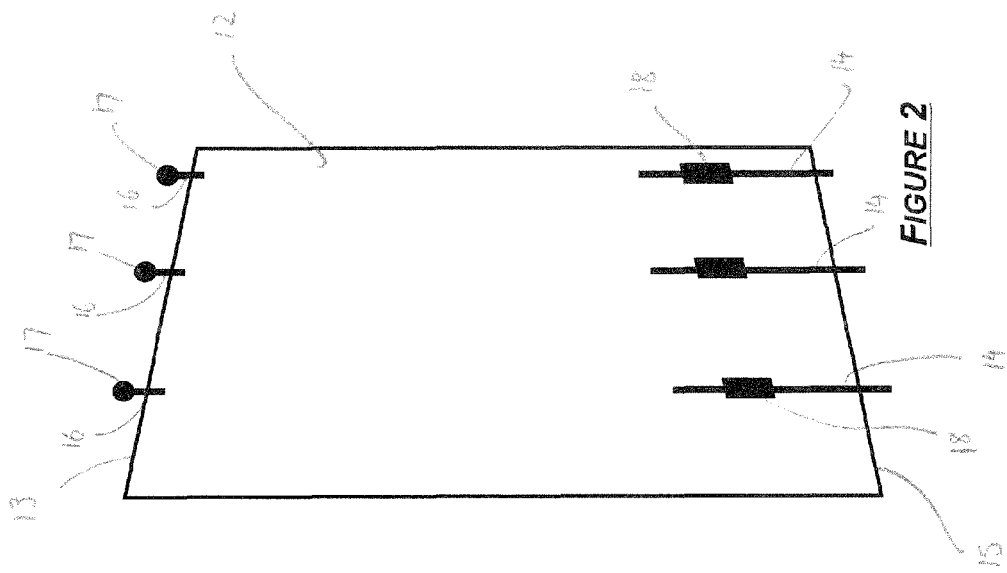
FIG. 2: is a perspective view of an external side of the curtain of FIG. 1.
Figure 1:
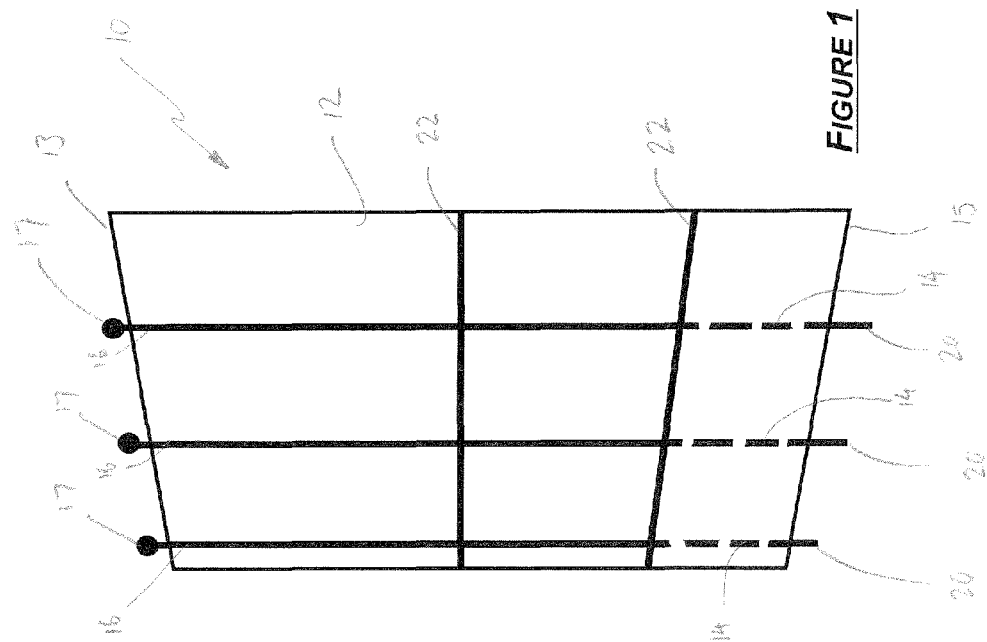
FIG. 1: is perspective view of an internal side of a curtain according to a first embodiment of the present invention.

FIGS. 1 and 2 show a vehicle side curtain 10 according to a first embodiment of the present invention, which may be used on a truck. The curtain 10 includes a sheet 12, which in use provides a weather resistant barrier between the load bay and the elements. The sheet 12 has an upper edge 13 for location adjacent the roof of the vehicle.

The curtain 10 also has a first set of straps 14 that extend between the upper edge 13 and the opposing lower edge 15 of the sheet, and are restrained to the sheet 12. Upper ends 16 of the straps 14 are secured to rollers 17, which are to run in a track along the load bay roof of a truck.

The curtain 10 further has tensioners 18 at the lower end 20 of each strap 14. The tensioners 18 engage with a rail on the edge of the load bed of the truck.

The curtain 10 further has a second set of straps 22 that extend transversely to the first set of straps 14 and are also restrained to the sheet 12. In this case, the second set of straps 22 extend in the lengthwise direction of the truck. As can be seen in FIGS. 1 and 2, the first and second sets of straps 14, 22 are generally orthogonal, and thus support tensile forces in generally orthogonal directions across the sheet 12.

In the embodiment shown in FIGS. 1 and 2, the sheet 12 is made of polyvinyl chloride (PVC) and the straps 14, 22 have a PVC coating. The straps 14, 22 are restrained to the sheet 12 by plastic welding. In this embodiment, the plastic welding is along the entire length of the overlap between the sheet 12 and the straps 14, 22. However, in some alternative embodiments, plastic welds may be formed at discrete, spaced apart locations where the sheet 12 overlaps with the straps 14, 22.

Restraining the straps 14, 22 to the sheet 12 has the benefit of limiting separation of the straps 14, 22 as load is applied to the curtain 10. Furthermore, if the straps of at least the first set 14 are tensioned (as will be described later), the sheet 12 is less likely to flap when the vehicle travels at speed.

As will be appreciated, the number of straps in each the first and second sets of straps 14, 22 can be selected to suit the particular application.

Each of the straps in the first and second sets include a plurality of stuffer strands that resist elongation of the respective strap in response to tensile forces applied in the elongate direction of the strap. Due to the construction of the straps, the stuffer strands are straight with respect to the lengthwise direction of the respective strap.

The stuffer strands are made of a material that has a maximum elongation at break of less than 7.5%. In particular, the stuffer strands are yarns of para-linked aramid fibres sold by Teijin Corporation under the trade name TECHNORA®. These yarns have a maximum elongation at break of less than 5%. Specifically, these yarns can have a maximum elongation at break of approximately 4.6%.

Because the curtain 10 uses straps with such stuffer strands, the curtain 10 has the distinct advantage of being able to meet the load restraint requirements. Accordingly, this enables such a curtain to be used as a load restraint. However, it will be appreciated that, in practice, the curtain 10 must be installed in a vehicle that has a sufficiently strong roof and load bed construction to meet the load protrusion requirements.

A further advantage of the straps of the curtain 10 are that they can maintain more than half of its room temperature tensile strength and modulus at 250° C.

FIGS. 3 and 4 show a truck curtain 110 according to a second embodiment of the present invention. The truck curtain 110 has many features similar to that of the curtain 10 of the first embodiment. Accordingly, features of the curtain 110 that generally correspond with features of the curtain 10 have been assigned corresponding reference numerals incremented by 100.

The curtain 110 differs from the curtain 10 in that the sheet 112 is formed with sleeves 124, 126. Each of the first set of straps 114 passes through one of the sleeves 124, which restrain the respective strap to the sheet 112. Similarly, each of the second set of straps 122 passes through one of the sleeves 126, which also restrain the respective strap to the sheet 112.

Similarly to the curtain 10, restraining the straps 114, 122 to the sheet 112 limits spreading of the straps 114, 122 as load is applied to the curtain 10, and minimizes flapping of the sheet 112.

Embodiments may be provided in which each strap passes through a single long sleeve, or through a series of short sleeves.

The use of sleeves 124, 126 retains the straps from movement in a direction away from the sheet 112, or in a direction transverse to the elongate direction of the sleeve 124, 126. However, in some cases a small amount of relative movement between the respective strap and sleeve in the elongate direction of the strap can occur.

Since the straps of the first and second sets 114, 122 are not welded to the sheet 112, the straps need not be coated with PVC.

The straps used in the curtains 10, 110 have a casing that is formed of an intermeshing assembly of strands. A plurality of stuffer strands extend lengthwise through the casing and are located between two layers of the casing. Within the casing, the stuffer strands being arranged in at least two sets. Furthermore, the stuffer strands resist elongation of the strap in response to tensile forces applied in the elongate direction of the strap, and the stuffer strands have a maximum elongation at break of less than 7.5%.

For the purposes of this specification, the term "strand" is to be understood to relate to fibrous products, and includes mono-filament fibres and yarns.

Figures 5, 7:
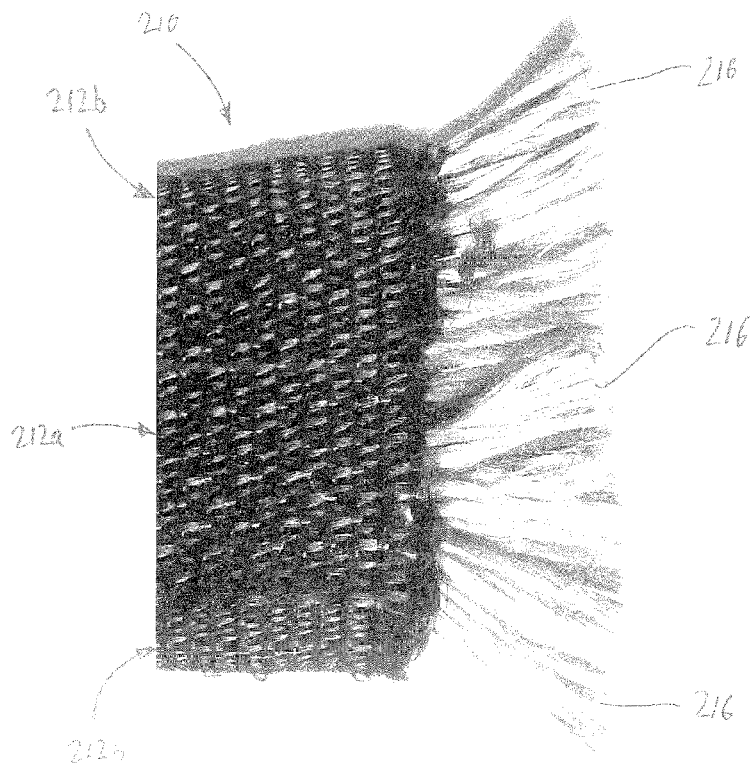
FIG. 5: is a fragmentary side view of an end of a strap according to a third embodiment of the present invention.
FIG. 7: is a diagram illustrating the arrangement of strands on the frames of a loom for weaving the strap of FIG. 5.
Figure 6:
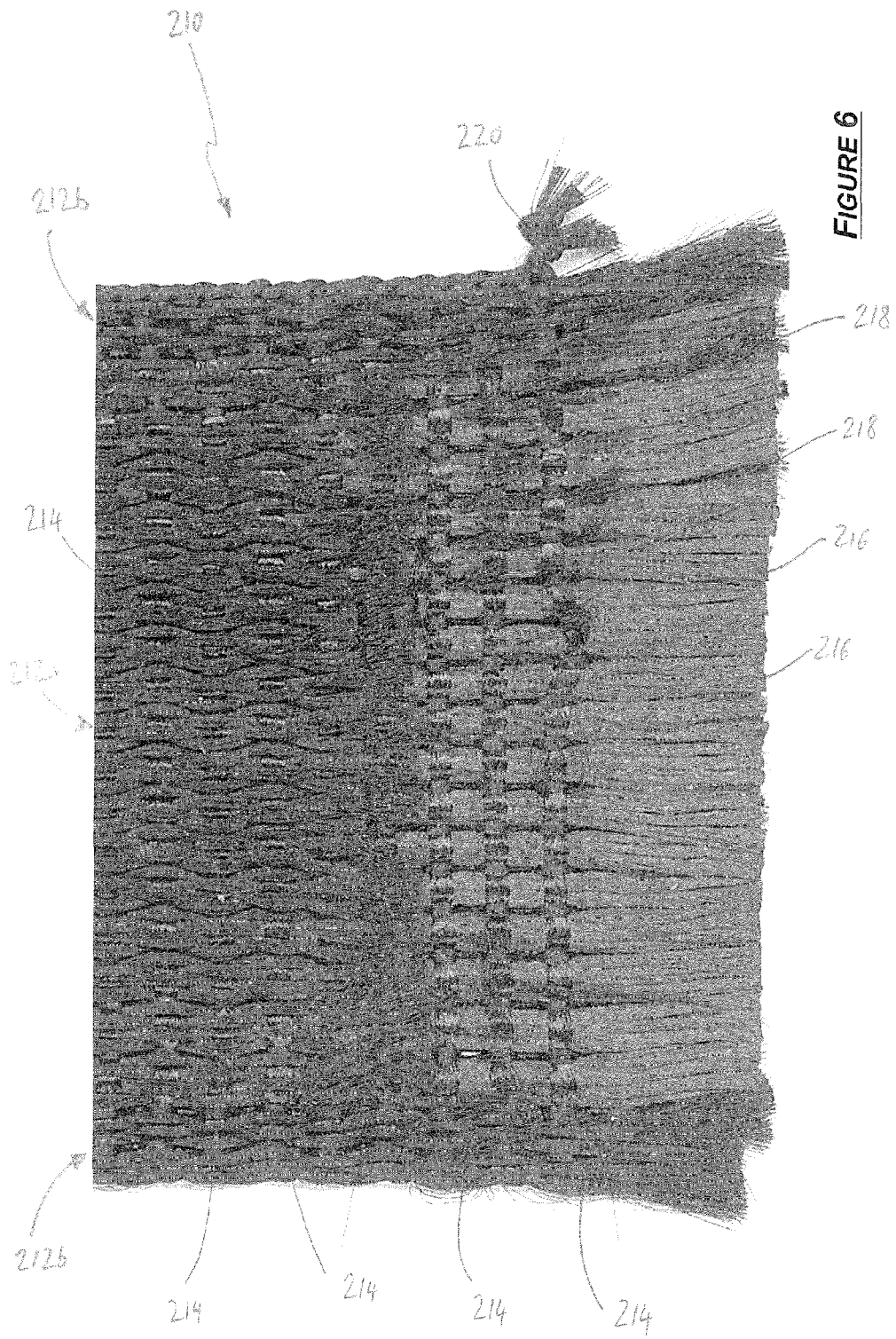
FIG. 6: is another fragmentary side view of an end of the strap shown in FIG. 5.

FIGS. 5 and 6 show a strap 210 according to a third embodiment of the present invention. The strap 210 is suitable for use with the curtains 10, 110 previously described.

In the strap 210, the casing is woven, and includes warp strands 212a, 212b that extend in the elongate direction of the strap 210, and a weft strand 214 that is interwoven transversely with the warp strands 212a, 212b. The warp and weft strands 212a, 212b, 214 can be collectively referred to as "body strands". The weave of the strap 210 is such that the strap 210 has a ribbon shape, and the stuffer strands are located between two layers of warp strands.

As shown in FIGS. 5 and 6, the woven casing also includes warp strands 212b on either lateral edge of the strap 210. In this embodiment, there are 4 warp strands 212b on each lateral edge outwardly of the stuffer strands 216. Some of the warp strands 212b, together with the weft strand 214, form selvages on either lateral edge of the strap 210.

The strap 210 also has stuffer strands 216 that extend lengthwise through the casing. The stuffer strands 216 are arranged in sets within in a central portion of the strap 210. The body strands are arranged with two layers of warp strands 212a on either side of the stuffer strands 216. The weft strand 214 passes alternately on either side of the stuffer strands 216 to be interwoven with the warp strands 212a, 212b in each layer.

In FIG. 5 the stuffer strands 216 have been shown in white, whereas in FIG. 6 the stuffer strands have been shown in dark grey.

The strap 210 also has binder strands 218, which can be seen in the fragmentary side view of FIG. 6. The binder strands 218 also extend in the warp direction of the strap 210 and are alternately interwoven with the weft strand 214 on either side of the stuffer strands 216. The binder strands 218 space adjacent sets of stuffer strands 216.

In FIG. 6, selected warp strands 212a have been trimmed back to expose the weft strand 214, and the underlying stuffer strands 216 and binder strands 218.

Due to the construction of the weave of the strap 210, the stuffer strands are not interwoven with the weft strand 214, but are straight with respect to the lengthwise direction of the strap 210. In other words, the stuffer strands are parallel with the elongate direction of the strap along the length of the strap. The weft strand 214 and the binder strands 218 co-operate to hold the stuffer strands 216 in position.

When the strap 210 is subjected to a tensile load, the stuffer strands resist elongation of the strap in response to tensile forces applied in the elongate direction of the strap. This has the advantage that tensile forces do not work against woven strands (such as warp strands 212a, 212b), which would both straighten and elongate under strain.

On one lateral edge of the strap 210 (on the right hand side of FIG. 6) a locking strand is provided to form locking stitches with the weft strand 214. In FIG. 6, the weft strand 214 is cut at the lateral edge to show one such locking stitch 220.

FIG. 7 illustrates one possible arrangement of strands on the frames of a loom for weaving the strap shown in FIGS. 5 and 6. In the FIG. 7, binder strands are arranged on frame 1, stuffer strands are arranged on frame 2, and warp strands are arranged on frames 3 to 10.

Figure 8:
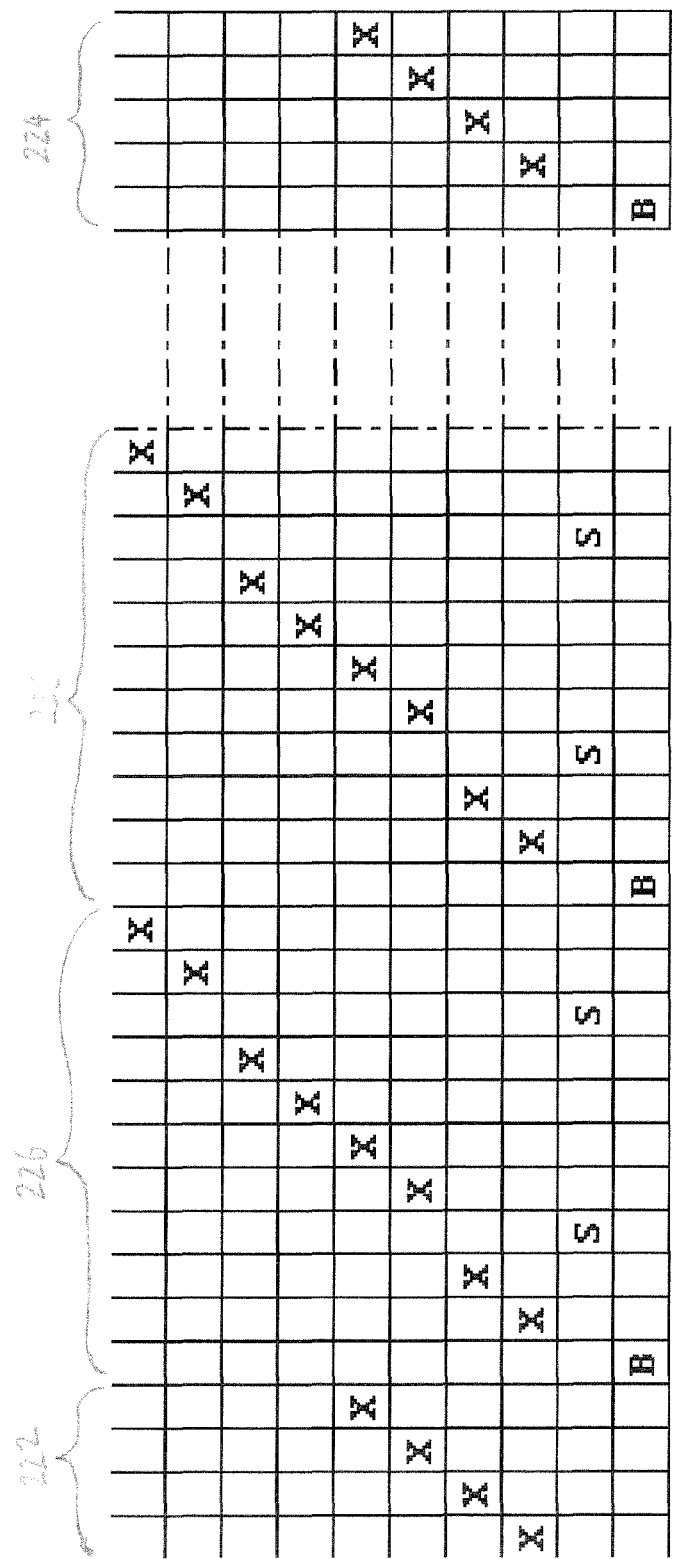
FIG. 8: is a diagram illustrating the weave pattern for the strap of FIG. 5 using the arrangement of FIG. 7.

FIG. 8 illustrates the weave pattern of the embodiment shown in FIGS. 5 and 6, using a loom with strands arranged on frames as per FIG. 7. In FIG. 8, portion 222 of the weave pattern shows the weave pattern for one lateral edge of the strap. All four strands in portion 222 are warp strands X.

Portion 224 shows the weave pattern for the opposing lateral edge of the strap, which includes a binder strand B and four warp strands X.

Portion 226 illustrates the weave pattern for the central portion of the strap, which includes body warp strands X, stuffer strands S and binder strands B. It will be understood that the portion 226 is repeated laterally across the strap as many times as desired between the lateral edges 222, 224 of the strap 210.

As can be seen from FIG. 8, in portion 226 the pattern includes two stuffer strands S and a single binder strand B. Thus, the stuffer strands S are provided in set of two stuffer strands, with adjacent sets being spaced by a binder strand B. Each stuffer strand consists of multiple number of strand number 25.

The strap further includes a locking strand, which is not arranged on a frame of the loom, and thus not shown in FIGS. 7 and 8.

The specifications for the strands used in the specific embodiment illustrated in FIGS. 5 and 6 are as follows:
  Weft strands: 1 End
  550×1 D/tex polyester
  Warp strands: 224 Ends
  550×1 D/tex polyester
  Binder strands: 21 Ends
  400×1 D/tex TECHNORA® aramid fibre
  Stuffer strands: 150 Ends
  1670×1 D/tex TECHNORA® aramid fibre
  Locking strand: 1 End
  550 D/tex polyester These specifications, in combination with the weave pattern described above, produce a strap that is approximately 48 mm in width, and has a break load of the order of approximately 45 kN.

The stuffer strands are yarns of para-linked aramid fibres sold by Teijin Corporation under the trade name TECHNORA®. These yarns have a maximum elongation at break of approximately 4.6%. This material can maintain more than half of its room temperature tensile strength and modulus at 250° C.

The strap 210 may be suitable for use in load restraining system. The system may have tensioners in the form of ratchets, buckles and/or winches.

An alternative embodiment of a strap that is particularly suitable for welding to the fabric used for truck side curtains can have an identical weave pattern to the strap illustrated in FIGS. 5 and 6, but uses the following specifications for the strands:
  Weft strands: 1 End
  400×1 D/tex TECHNORA® aramid fibre
  Warp strands: 224 Ends
  400×1 D/tex TECHNORA ® aramid fibre
  Binder strands: 21 Ends
  400×1 D/tex TECHNORA ® aramid fibre
  Stuffer strands: 150 Ends 1670×1 D/tex TECHNORA ® aramid fibre
  Locking strand: 1 End
  400 D/tex TECHNORA ® aramid fibre The above-described strap can readily be coated (or otherwise impregnated) with PVC.

An alternative embodiment of a strap may have a casing a knitted construction with chains extending in the elongate direction of the strap, and one or more weft strands that intermesh with the chains to form the casing with the plurality of stuffer strands therebetween. The stuffer strands extend lengthwise through the casing and are located between two layers of the casing, in at least two sets.

This type of casing is known as a warp knit crochet construction. In a particular embodiment, the strap has 23 sets of stuffer strands, which are separated by lengthwise chain strands in the casing. At each edge, the strap has 2 chain strands with no stuffer strands therebetween. At least one row of chain strands are provided between adjacent sets of stuffer strands.

The specifications for the strands used in the above-described strap with a knitted casing are as follows:

Chains strands: 28 Ends 550×1 D/tex polyester

Weft strands: 2 Ends 400×1 D/tex TECHNORA® aramid fibre

Stuffer strands: 150 Ends 1670×1 D/tex TECHNORA® aramid fibre

Another alternative embodiment of a strap may have a casing formed of a non-fibrous sheath. The non-fibrous sheath effectively forms two spaced layers that sandwich the sets of stuffer strands therebetween. In one form the non-fibrous sheath is made of plastics material that is extruded with the stuffer strands disposed within the sheath during the extrusion process.

In one alternative form, the non-fibrous sheath is made of two layers that are joined at the peripheral edges, parallel to the stuffer strands, such that the stuffer strands extend through the casing. The two layers may be joined by adhesives, welding or the like.

The non-fibrous sheath may be made of plastics materials, including (but not limited to) polyester, polyvinyl chloride, or polystyrene.

Within the sheath, the sets of stuffer strands may be spaced apart by the sheath material. Alternatively or additionally, the sets of stuffer strands may be spaced apart by other materials.

In embodiments in which the casing is formed of a non-fibrous sheath, the stuffer strands can be pre-stressed during formation of the sheath around the strands.

The use of the above-described vehicle side curtain can provide an effective load restraint system because the stuffer strands within the straps resist elongation of the respective strap in response to tensile forces. When a load shifts on the load bed of the vehicle, and bears against the curtain, the straps resist the stretch of the curtain, which minimizes the extent to which the load will protrude beyond the side of the load bed. As previously described, the curtain of the present invention is suitable for use as a load restraint.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A vehicle side curtain comprising:
a sheet with upper and lower edges for location adjacent the roof and floor of the vehicle;
a set of straps that extend spaced apart between the upper and lower edges of the sheet and are at least partially restrained to the sheet, each of the straps includes one or more linear stuffer strands that resist elongation of the respective strap in response to tensile forces applied in the elongate direction of the strap, and the stuffer strands have a maximum elongation at break of less than 7.5%.

2. A vehicle side curtain according to claim 1, wherein the stuffer strands have a maximum elongation at break of less than 5%.

3. A vehicle side curtain according to claim 1, wherein the stuffer strands are made of a material having a tensile strength at 250° C. that is greater than at least half the tensile strength at room temperature.

4. A vehicle side curtain according to claim 1, wherein the stuffer strands are made of aramid fibres.

5. A vehicle side curtain according to claim 1, wherein the stuffer strands are made of para-linked aramid fibre.

6. A vehicle side curtain according to claim 1, wherein the sheet has side edges and a set of straps that extend spaced apart from one side edge to the other.

7. A vehicle side curtain according to claim 1 wherein the straps have a PVC coating and are welded to the sheet.

8. A vehicle side curtain according to claim 1, wherein the stuffer strands have a maximum elongation at break of 4.6%.

9. A vehicle side curtain according to claim 1, wherein each strap further comprises:
a casing; and
the stuffer strands extend lengthwise through the casing and are located between two layers of the casing, with the stuffer strands being arranged in at least two sets.

10. A vehicle side curtain according to claim 9, wherein the casing is formed of an intermeshing assembly of strands.

11. A vehicle side curtain according to claim 10, wherein:
the casing of each strap has a woven construction that includes warp strands extending in the elongate direction of the strap, and at least one weft strand that is interwoven transversely with the warp strands;
each strap further comprises at least one binder strand that extends in the warp direction of the strap, that is interwoven with the at least one weft strand, and that spaces adjacent sets of stuffer strands; and
wherein the stuffer strands are located between two layers of warp strands.

12. A strap comprising:
casing, and
a plurality of stuffer strands extending lengthwise through the casing and being located between two layers of the casing, the stuffer strands being arranged in at least two sets,
wherein the stuffer strands resist elongation of the strap in response to tensile forces applied in the elongate direction of the strap, and the stuffer strands have a maximum elongation at break of less than 7.5%.

13. A strap according to claim 12, wherein the casing is formed of an intermeshing assembly of strands.

14. A strap according to claim 13, wherein the casing has a woven construction that includes warp strands extending in the elongate direction of the strap, and at least one weft strand that is interwoven transversely with the warp strands; and
the strap further comprises at least one binder strand that extends in the warp direction of the strap, that is interwoven with the at least one weft strand, and that spaces adjacent sets of stuffer strands,
and wherein the plurality of stuffer strands are located between two layers of warp strands.

15. A strap according to claim 12, wherein the stuffer strands have a maximum elongation at break of less than 5%.

16. A strap according to claim 12, wherein the stuffer strands are made of aramid fibres.

17. A strap according to claim 12, wherein the stuffer strands are made of para-linked aramid fibre.

18. A strap according to claim 12, wherein the stuffer strands are made of a material that maintains more than half of its room temperature tensile strength and modulus at 250° C.

19. A strap according to claim 12, wherein the strap comprises between 10 and 20 sets of stuffer strands.

20. A load restraining system, comprising the strap of claim 12.

\* \* \* \* \*